(12) United States Patent
Yang et al.

(10) Patent No.: US 9,674,529 B2
(45) Date of Patent: Jun. 6, 2017

(54) INTRA-FRAME DECODING METHOD AND APPARATUS FOR SIGNAL COMPONENT SAMPLING POINT OF IMAGE BLOCK

(71) Applicant: Huawei Technologies Co., Ltd., Shenzhen, Guangdon (CN)

(72) Inventors: Haitao Yang, Shenzhen (CN); Jiantong Zhou, Shenzhen (CN); Oscar Au, Hong Kong (HK)

(73) Assignee: Huawei Technologies Co., Ltd., Shenzhen (CN)

( * ) Notice: Subject to any disclaimer, the term of this patent is extended or adjusted under 35 U.S.C. 154(b) by 379 days.

(21) Appl. No.: 14/265,491

(22) Filed: Apr. 30, 2014

(65) Prior Publication Data

US 2014/0233641 A1   Aug. 21, 2014

Related U.S. Application Data

(63) Continuation of application No. PCT/CN2012/084074, filed on Nov. 5, 2012.

(30) Foreign Application Priority Data

Nov. 4, 2011 (CN) .......................... 2011 1 0344943

(51) Int. Cl.
*H04N 19/593* (2014.01)
*H04N 19/176* (2014.01)
(Continued)

(52) U.S. Cl.
CPC ....... *H04N 19/00763* (2013.01); *H04N 19/11* (2014.11); *H04N 19/157* (2014.11);
(Continued)

(58) Field of Classification Search
CPC combination set(s) only.
See application file for complete search history.

(56) References Cited

U.S. PATENT DOCUMENTS

| 2011/0255591 A1* | 10/2011 | Kim | ..................... H04N 19/107 |
| | | | 375/240.02 |
| 2016/0142706 A1* | 5/2016 | Chuang | ................ H04N 19/159 |
| | | | 375/240.08 |

FOREIGN PATENT DOCUMENTS

| CA | 2822800 A1 * | 6/2012 | ............... H04N 7/34 |
| CN | 1535027 A | 10/2004 | |

(Continued)

OTHER PUBLICATIONS

"Series H: Audiovisual and Multimedia Systems, Infrastructure of audiovisual services—Coding of moving video; Advanced video coding for generic audiovisual services", International Telecommunication Union, H.264, Mar. 2010, 669 pages.
(Continued)

*Primary Examiner* — Sath V Perungavoor
*Assistant Examiner* — Janese Duley (57) ABSTRACT

Embodiments of the present invention provide an intra-frame decoding method and apparatus for a signal component sampling point of an image block. The method includes: obtaining prediction mode information about a first signal component of a current block from a video code stream; determining a prediction mode for the first signal component of the current block, where the prediction mode for the first signal component of the current block is one of a DM mode and an LM mode; obtaining a prediction value of a first signal component sampling point of the current block according to the prediction mode for the first signal component of the current block; and obtaining a reconstruction value of the first signal component sampling point of the current block. The technical solutions provided by the embodiments of the present invention reduce complexity of implementing a decoding end.

14 Claims, 5 Drawing Sheets

(51) Int. Cl.
*H04N 19/11* (2014.01)
*H04N 19/70* (2014.01)
*H04N 19/186* (2014.01)
*H04N 19/157* (2014.01)
*H04N 19/44* (2014.01)

(52) U.S. Cl.
CPC ......... *H04N 19/176* (2014.11); *H04N 19/186* (2014.11); *H04N 19/70* (2014.11); *H04N 19/44* (2014.11); *H04N 19/593* (2014.11)

(56) References Cited

FOREIGN PATENT DOCUMENTS

| CN | 1784015 A | 6/2006 |
|---|---|---|
| CN | 101646081 A | 2/2010 |
| CN | 101820546 A | 9/2010 |
| CN | 101964906 A | 2/2011 |
| WO | WO 2011/126348 A2 | 10/2011 |

OTHER PUBLICATIONS

Jianle Chen, et al., "CE6.a: Chroma intra prediction by reconstructed luma samples", Joint Collaborative Team on Video Coding (JCT-VC) of ITU-T SG16 WP3 and ISO/IEC JTC1/SC29/WG11, Jan. 20-28, 2011, 7 pages.

Haitao Yang, et al., "Non-CE6: Remove potential duplicate modes from the candidate mode list for chroma intra prediction", Joint Collaborative Team on Video Coding (JCT-VC) of ITU-T SG16 WP3 and ISO/IEC JTC1/SC29/WG11, Nov. 21-30, 2011, 4 pages.

\* cited by examiner

INTRA-FRAME DECODING METHOD AND APPARATUS FOR SIGNAL COMPONENT SAMPLING POINT OF IMAGE BLOCK

CROSS-REFERENCE TO RELATED APPLICATIONS

This application is a continuation of International Application No. PCT/CN2012/084074, filed on Nov. 5, 2012, which claims priority to Chinese Patent Application No. 201110344943.2, filed on Nov. 4, 2011, both of which are hereby incorporated by reference in their entireties.

TECHNICAL FIELD

The present invention relates to the field of communications technologies, and in particular, to an intra-frame decoding method and apparatus for a signal component sampling point of an image block.

BACKGROUND

Existing video image coding technologies include an intra-frame coding technology and an inter-frame coding technology. The intra-frame coding refers to a technology of coding image content by using only a spatial correlation within a current image block that is being coded. The inter-frame coding refers to a technology of coding a current image block by using a time correlation between the current image block that is being coded and an image block that has been coded.

In order to increase intra-frame coding efficiency of an image, an H.264/AVC standard first introduces an intra-frame prediction technology to remove spatial information redundancy between a current image that is being coded (hereinafter referred to as a current block) and a neighboring coded image block. An HEVC solution is a new-generation standardized video coding solution currently being researched by the International Organization for Standardization. This solution inherits and expands an intra-frame prediction coding technology in the H.264/AVC standard. In the HEVC solution, a prediction mode set of an image block chrominance component may include six optional prediction modes:

DM mode: performing prediction by using a prediction mode for a luminance component of a current block as a prediction mode for a chrominance component of the current block;

LM mode: computing a prediction value of a chrominance component sampling point by using a reconstruction value of a luminance component sampling point based on a correlation model, where a parameter of the correlation model is obtained by performing computation according to reconstruction values of luminance component sampling points and chrominance component sampling points directly above and directly to the left of a current block;

DC mode: using an average value of reconstruction values of neighboring chrominance component sampling points directly above and directly to the left of a current block as a prediction value of a chrominance component sampling point of the current block;

Planar (Planar) mode: computing a prediction value of a chrominance component sampling point of a current block based on an assumption about a linear smooth variation of a value of a chrominance component sampling point in space;

Horizontal mode: using a reconstruction value of a neighboring chrominance component sampling point directly to the left of a current block as a prediction value of all chrominance component sampling points within a same row in the current block; and Vertical mode: using a reconstruction value of a neighboring chrominance component sampling point directly above a current block as a prediction value of all chrominance component sampling points within a same column in the current block.

The DC mode, the vertical mode, the horizontal mode, and the planar mode in the foregoing prediction modes and corresponding prediction modes in the H.264/AVC standard are the same in basic principles but different in specific implementation methods. The LM mode and the DM mode are two newly added prediction modes. Besides the foregoing prediction modes, a backup mode also exists. If the prediction mode for the current block luminance component is the same as a certain prediction mode among the rest of the modes in the prediction mode set, the prediction mode set of the chrominance component includes two identical prediction modes, namely, the DM mode and the certain prediction mode. In this case, the backup mode is used to replace the certain prediction mode, thereby forming a new prediction mode set in which no prediction modes are the same. The backup mode may be a prediction mode different from all the prediction modes in the prediction mode set of the chrominance component; for example, the backup mode may be a diagonal mode in which prediction is performed in a diagonal direction.

However, in the existing HEVC solution, selection of the prediction mode set of the chrominance component causes high complexity of implementing a decoding end.

SUMMARY

Embodiments of the present invention provide an intra-frame decoding method and apparatus for a signal component sampling point of an image block, so as to reduce complexity of implementing a decoding end.

An embodiment of the present invention provides an intra-frame decoding method for a signal component sampling point of an image block, including:

obtaining prediction mode information about a first signal component of a current block from a video code stream;

determining a prediction mode for the first signal component of the current block according to the prediction mode information about the first signal component of the current block, where the prediction mode for the first signal component of the current block is one of a DM mode and an LM mode;

obtaining a prediction value of a first signal component sampling point of the current block according to the prediction mode for the first signal component of the current block; and obtaining a reconstruction value of the first signal component sampling point of the current block according to the prediction value of the first signal component sampling point of the current block.

An embodiment of the present invention further provides an intra-frame decoding method for a signal component sampling point of an image block, including:

obtaining a prediction value of a first signal component sampling point of a current block always according to a prediction mode for a second signal component of the current block during a decoding process; and obtaining a reconstruction value of the first signal component sampling point of the current block according to the prediction value of the first signal component sampling point of the current block.

An embodiment of the present invention further provides an intra-frame decoding method for a signal component sampling point of an image block, including:

obtaining prediction mode information about a current block from a video code stream;

determining a prediction mode for the current block according to the prediction mode information about the current block, where the prediction mode for the current block is used to predict a first signal component and a second signal component of the current block;

obtaining a prediction value of a first signal component sampling point of the current block according to the prediction mode for the current block; and obtaining a reconstruction value of the first signal component sampling point of the current block according to the prediction value of the first signal component sampling point of the current block.

An embodiment of the present invention further provides an intra-frame decoding apparatus for a signal component sampling point of an image block, including:

a first obtaining unit, configured to obtain prediction mode information about a first signal component of a current block from a video code stream;

a first determining unit, configured to determine a prediction mode for the first signal component of the current block according to the prediction mode information about the first signal component of the current block, where the prediction mode for the first signal component of the current block is one of a DM mode and an LM mode;

a first predicting unit, configured to obtain a prediction value of a first signal component sampling point of the current block according to the prediction mode for the first signal component of the current block; and a first computing unit, configured to obtain a reconstruction value of the first signal component sampling point of the current block according to the prediction value of the first signal component sampling point of the current block.

An embodiment of the present invention further provides an intra-frame decoding apparatus for a signal component sampling point of an image block, including:

a second predicting unit, configured to obtain a prediction value of a first signal component sampling point of a current block always according to a prediction mode for a second signal component of the current block during a decoding process; and a second computing unit, configured to obtain a reconstruction value of the first signal component sampling point of the current block according to the prediction value of the first signal component sampling point of the current block.

An embodiment of the present invention further provides an intra-frame decoding apparatus for a signal component sampling point of an image block, including:

a second obtaining unit, configured to obtain prediction mode information about a current block from a video code stream;

a second determining unit, configured to determine a prediction mode for the current block according to the prediction mode information about the current block, where the prediction mode for the current block is used to predict a first signal component and a second signal component of the current block;

a third predicting unit, configured to obtain a prediction value of a first signal component sampling point of the current block according to the prediction mode for the current block; and a third computing unit, configured to obtain a reconstruction value of the first signal component sampling point of the current block according to the prediction value of the first signal component sampling point of the current block.

In the technical solutions provided by the embodiments of the present invention, a technical means of providing a simplified prediction mode set is used, thereby reducing complexity of implementing a decoding end.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

A video image signal usually includes one luminance component and two chrominance components. The luminance component is usually represented by a symbol Y, and the chrominance components are usually represented by symbols U and V. However, it can be understood that the technical solutions of the present invention are not only applicable to a YUV format but also applicable to mutual prediction between different components in another video image format, for example, an RGB format.

For ease of description, the embodiments of the present invention adopt expressions of a first signal component and a second signal component. If an image signal includes a luminance signal component and a chrominance signal component, the first signal component may be a chrominance component, and the second signal component may be a luminance component; if an image signal includes three signal components R, G, and B, the first signal component may be any signal component of the three signal components R, G, and B, and the second signal component may be one signal component of the three signal components R, G, and B other than the first signal component; and if an image signal is divided into multiple signal components in another manner, a similar method may be used to define the first signal component and the second signal component.

In the embodiments of the present invention, a DM mode is a prediction mode in which a prediction value of a first signal component sampling point of a current block is computed from a reconstruction value of a surrounding first signal component sampling point of the current block according to a prediction mode for a second signal component of the current block; and an LM mode is a prediction mode in which a prediction value of a first signal component sampling point of the current block is computed based on a reconstruction value of a second signal component sampling point of the current block.

In the following, the embodiments of the present invention are described by using an example that a first signal component is a chrominance component and a second signal component is a luminance component.

The embodiments of the present invention take into consideration that the DM mode may be the same as any one of a planar mode, a DC mode, a horizontal mode, and a vertical mode, which means that redundancy exists in an existing prediction mode set of the chrominance component, and the redundancy affects video image compression efficiency and increases complexity of implementing coding and decoding.

In order to remove the redundancy in the prediction mode set of the chrominance component, a prediction mode set of the chrominance component used by this embodiment only includes two prediction modes: the DM mode and the LM mode. The DM mode is a prediction mode in which a prediction value of a chrominance component sampling point of a current block is computed from a reconstruction value of a surrounding chrominance component sampling point of the current block according to a prediction mode for a second signal component of the current block; and the LM mode is a prediction mode in which a prediction value of a chrominance component sampling point of the current block is computed based on a reconstruction value of a luminance component sampling point of the current block. Both the DM mode and the LM mode are prediction modes specific to the chrominance component, and both of the modes use a correlation between the luminance component and the chrominance component to increase compression efficiency. The DM mode uses a correlation between a prediction mode for the luminance component and a prediction mode for the chrominance component to increase compression efficiency of the prediction mode for the chrominance component, and the LM mode uses a correlation between a sampling value of the luminance component and a sampling value of the chrominance component to increase accuracy of predicting the sampling value of the chrominance component.

A characteristic of the prediction mode set of the chrominance component used in the embodiments of the present invention lies in that no redundant prediction mode exists in the set. A reason is that the set does not include optional prediction modes for the luminance component such as the planar mode, the DC mode, the horizontal mode, and the vertical mode, and therefore does not include a prediction mode representing the same mode as the DM mode. In this way, a decoding end does not need to adjust content of the set of optional prediction modes for the chrominance component according to the prediction mode for the luminance component to remove the redundancy, thereby reducing complexity of the decoding end. In another aspect, the embodiments of the present invention adopt the simple prediction mode set of the chrominance component, so that a method for indicating prediction mode information about the chrominance component in a video code stream is simpler compared with that in the prior art, thereby reducing both complexity of a coding end and decoding complexity of the decoding end. For example, when the prediction mode set of the chrominance component only includes the DM mode and the LM mode, a simple codeword, for example, one flag, may be used in the code stream to indicate a result of prediction mode selection; and when the prediction mode set of the chrominance component only includes the DM mode, no syntax element is needed in the code stream to independently indicate a result of prediction mode selection for the chrominance component.

Figure 1:
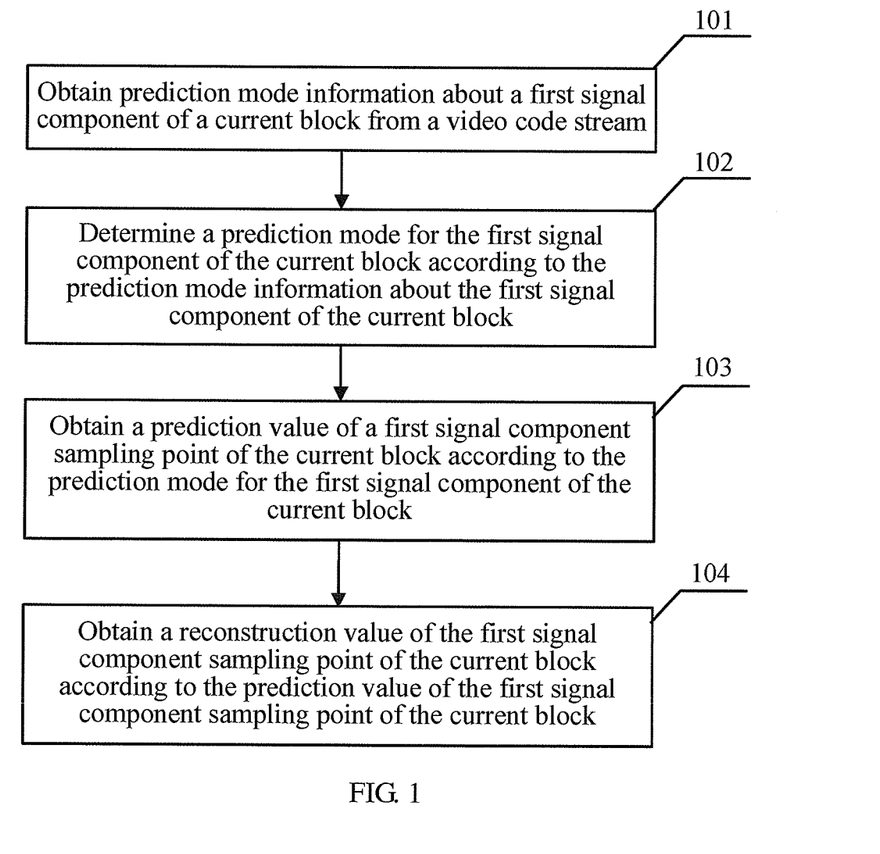
FIG. 1 is a flowchart of a decoding method according to an embodiment of the present invention.

With reference to FIG. 1, the following describes an intra-frame decoding method for a signal component sampling point of an image block provided by an embodiment of the present invention.

S101: Obtain prediction mode information about a first signal component of a current block from a video code stream.

S102: Determine a prediction mode for the first signal component of the current block according to the prediction mode information about the first signal component of the current block, where the prediction mode for the first signal component of the current block is one of a DM mode and an LM mode.

S103: Obtain a prediction value of a first signal component sampling point of the current block according to the prediction mode for the first signal component of the current block.

S104: Obtain a reconstruction value of the first signal component sampling point of the current block according to the prediction value of the first signal component sampling point of the current block.

In the technical solution provided by the embodiment of the present invention, a technical means of providing a prediction mode set that is of the first signal component and includes only the DM mode and the LM mode is used, thereby reducing complexity of implementing a decoding end.

Figure 2:
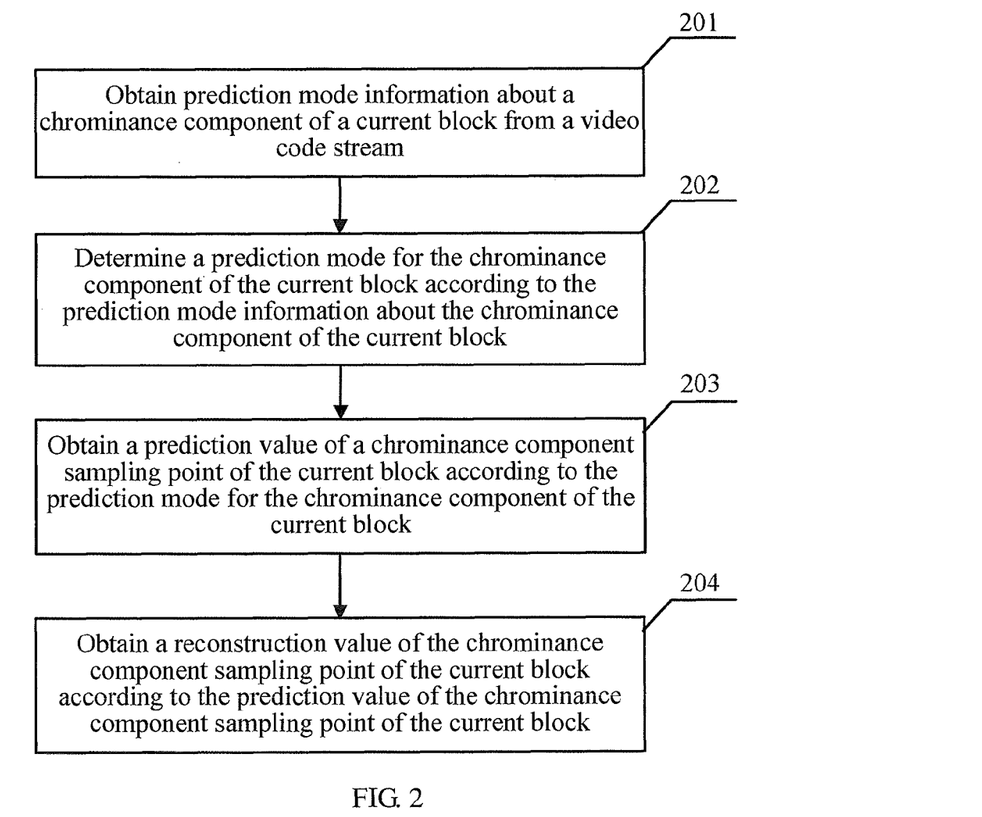
FIG. 2 is a flowchart of a decoding method according to an embodiment of the present invention.

With reference to FIG. 2, the following describes an intra-frame decoding method for a signal component sampling point of an image block provided by an embodiment of the present invention by using an example that a first signal component is a chrominance component and a second signal component is a luminance component.

S201: Obtain prediction mode information about a chrominance component of a current block from a video code stream.

S202: Determine a prediction mode for the chrominance component of the current block according to the prediction mode information about the chrominance component of the current block, where the prediction mode for the chrominance component of the current block is one of a DM mode and an LM mode.

In the embodiment of the present invention, a prediction mode set of the chrominance component only includes two modes: the DM mode and the LM mode, and therefore the prediction mode for the chrominance component of the current block determined according to the prediction mode information about the chrominance component of the current block is one of the DM mode and the LM mode.

In the embodiment of the present invention, an example that the prediction mode information about the chrominance component of the current block is a flag is used for description. It can be understood that the prediction mode information may also be indicated in another manner. In the embodiment of the present invention, one flag may be used as the prediction mode information about the chrominance component of the current block to indicate whether the prediction mode for the chrominance component of the current block is the DM mode or the LM mode. For example, a flag being 0 indicates that the prediction mode for the chrominance component of the current block is the DM mode, and a flag being 1 indicates that the prediction mode for the chrominance component of the current block is the LM mode.

Entropy coding and entropy decoding of the flag of the current block may be performed by using the following methods.

If an entropy coding mode is binary arithmetic coding based on a context model, the context model used by an entropy coder may be determined based on values of flags of an upper block and a left block of the current block. For example, three context models may be used to code the flag of the current block. In this case, a method for determining the context model is to add values of the flags of the upper block and the left block of the current block, and determine, according to an obtained value (which may be 0, 1, or 2), which one of the three context models is used to code the flag of the current block. The coder and a decoder determine the context model by using the same method. The coder writes the flag of the current block into the code stream based on the determined context model; and the decoder obtains the flag of the current block from the code stream based on the determined context model. The upper block and the left block of the current block refer to an image block above the current block and an image block to the left of the current block that are adjacent to the current block in a spatial location relationship. If the upper block or the left block of the current block does not exit, or the flag of the upper block or the left block does not exist, the flag of the upper block or the left block may be set to a default value, and then the foregoing method may be used to determine the context model of the flag of the current block.

In some implementation manners, in order to simplify coding and decoding operations, a determined context model may also be used to code the flag of the current block. Further, binary arithmetic coding and decoding may also be directly performed on the flag of the current block without using the context model.

If the entropy coding mode is variable length coding, the coder may directly write the flag of the current block into the code stream, and the decoder may directly obtain the flag of the current block from the video code stream.

S203: Obtain a prediction value of a chrominance component sampling point of the current block according to the prediction mode for the chrominance component of the current block.

In the embodiment of the present invention, if it is determined in S202 that the prediction mode for the chrominance component of the current block is the DM mode, the prediction value of the chrominance component sampling point of the current block may be computed from a reconstruction value of a surrounding chrominance component sampling point of the current block according to a prediction mode for a luminance component of the current block. That is, the prediction mode for the luminance component of the current block may be used as the prediction mode for the chrominance component of the current block, and the prediction value of the chrominance component sampling point of the current block is computed from the reconstruction value of the surrounding chrominance component sampling point of the current block according to the prediction mode for the chrominance component of the current block.

If it is determined in S202 that the prediction mode for the chrominance component of the current block is the LM mode, the prediction value of the chrominance component sampling point of the current block may be computed based on a reconstruction value of a luminance component sampling point of the current block.

In the embodiment of the present invention, the prediction mode for the luminance component of the current block may be one of a DC mode, a vertical mode, a horizontal mode, and a planar mode, and may also be another directional prediction mode. In the LM mode and the DM mode, a method in the prior art may be used as a method for obtaining the prediction value of the chrominance component sampling point of the current block, and details are not repeatedly described herein.

S204: Obtain a reconstruction value of the chrominance component sampling point of the current block according to the prediction value of the chrominance component sampling point of the current block.

The reconstruction value of the chrominance component sampling point of the current block is computed based on the obtained prediction value of the chrominance component sampling point of the current block and a residual value of the chrominance component sampling point of the current block obtained by performing reconstruction. The residual value of the chrominance component sampling point of the current block may be obtained based on residual information about the chrominance component sampling point of the current block that is obtained from the video code stream. Specifically, the residual value of the chrominance component sampling point of the current block may be reconstructed by using a method in an H.264/AVC standard or a current HEVC solution, and details are not described herein.

In the technical solution provided by the embodiment of the present invention, a technical means of providing a prediction mode set that is of the chrominance component and includes only the DM mode and the LM mode is used, thereby reducing complexity of implementing a decoding end.

Figure 3:
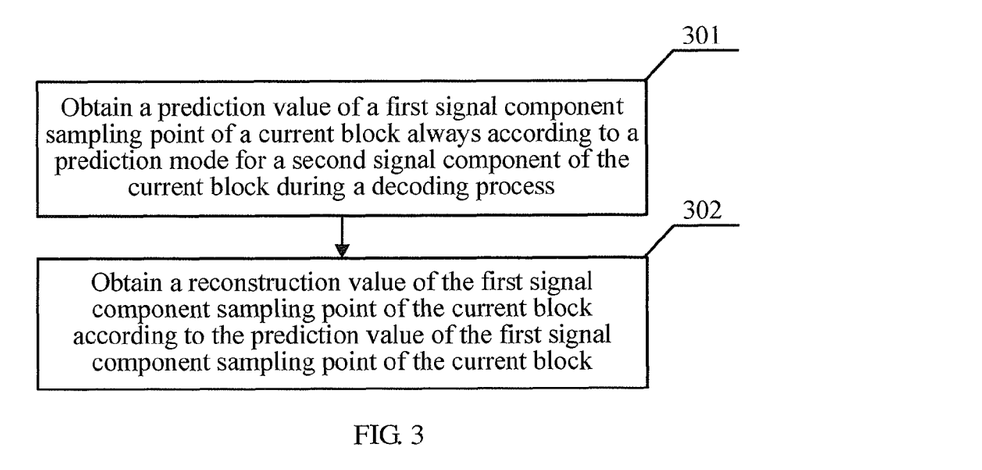
FIG. 3 is a flowchart of a decoding method according to an embodiment of the present invention.

With reference to FIG. 3, the following describes an intra-frame decoding method for a signal component sampling point of an image block provided by an embodiment of the present invention.

S301: Obtain a prediction value of a first signal component sampling point of a current block always according to a prediction mode for a second signal component of the current block during a decoding process.

S302: Obtain a reconstruction value of the first signal component sampling point of the current block according to the prediction value of the first signal component sampling point of the current block.

In the technical solution provided by the embodiment of the present invention, a technical means of obtaining the prediction value of the first signal component sampling point of the current block always according to the prediction mode for the second signal component of the current block during the decoding process is used, thereby reducing complexity of implementing a decoding end.

Figure 4:
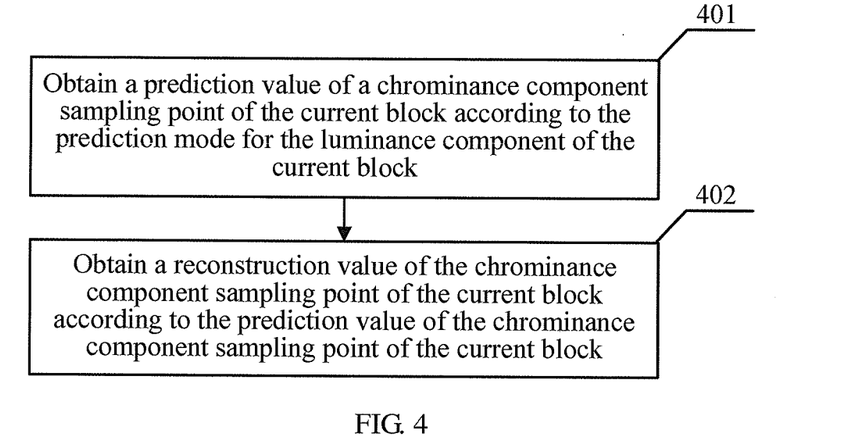
FIG. 4 is a flowchart of a decoding method according to an embodiment of the present invention.

With reference to FIG. 4, the following describes an intra-frame decoding method for a signal component sampling point of an image block provided by an embodiment of the present invention by using an example that a first signal component is a chrominance component and a second signal component is a luminance component.

In the embodiment of the present invention, a prediction value of a chrominance component sampling point of a current block is determined always according to a prediction mode for the luminance component of the current block during a decoding process. That is, a prediction mode set of the chrominance component includes only one prediction mode being a DM mode; and in the decoding process, the prediction mode for the luminance component of the current block is always used as a prediction mode for the chrominance component of the current block. It should be noted that in some embodiments, that the prediction mode set of the chrominance component includes only one prediction mode being the DM mode may be construed to indicate that the prediction mode set of the chrominance component does not exist, and the prediction mode for the chrominance component of the current block is determined simply according to the prediction mode for the luminance component of the current block.

In the embodiment of the present invention, an LM mode is further excluded from optional prediction modes for the chrominance component. The LM mode requires computation of a correlation model parameter of the luminance component and the chrominance component, and compared with other existing prediction modes for the chrominance component, has higher computation complexity and therefore as higher power consumption, and therefore is not suitable for coding and decoding applications in some low-power consumption mobile devices.

Because the prediction mode for the chrominance component in the embodiment of the present invention is only the DM mode, no prediction mode information for the chrominance component needs to be transmitted in a code stream to a decoder. The decoder uses the prediction mode for the luminance component of the current block as the prediction mode for the chrominance component of the current block. In other words, a same prediction mode is used for the luminance component and the chrominance component.

S401: Obtain a prediction value of a chrominance component sampling point of the current block according to the prediction mode for the luminance component of the current block.

In the embodiment of the present invention, the prediction value of the chrominance component sampling point of the current block may be computed from a reconstruction value of a surrounding chrominance component sampling point of the current block according to the prediction mode for the luminance component. That is, the prediction mode for the luminance component of the current block is used as the prediction mode for the chrominance component of the current block, and the prediction value of the chrominance component sampling point of the current block is computed from the reconstruction value of the surrounding chrominance component sampling point of the current block according to the prediction mode for the chrominance component of the current block.

S402: Obtain a reconstruction value of the chrominance component sampling point of the current block according to the prediction value of the chrominance component sampling point of the current block.

The reconstruction value of the chrominance component sampling point of the current block is computed based on the obtained prediction value of the chrominance component sampling point of the current block and a residual value of the chrominance component sampling point of the current block obtained by performing reconstruction. The residual value of the chrominance component sampling point of the current block may be obtained based on residual information about the chrominance component sampling point of the current block that is obtained from a video code stream. Specifically, the residual value of the chrominance component sampling point of the current block may be reconstructed by using a method in an H.264/AVC standard or a current HEVC solution, and details are not described herein.

In the technical solution provided by the embodiment of the present invention, a technical means of always using the prediction mode for the luminance component of the current block as the prediction mode for the chrominance component of the current block in the decoding process is used, thereby reducing complexity of implementing a decoding end.

Figure 5:
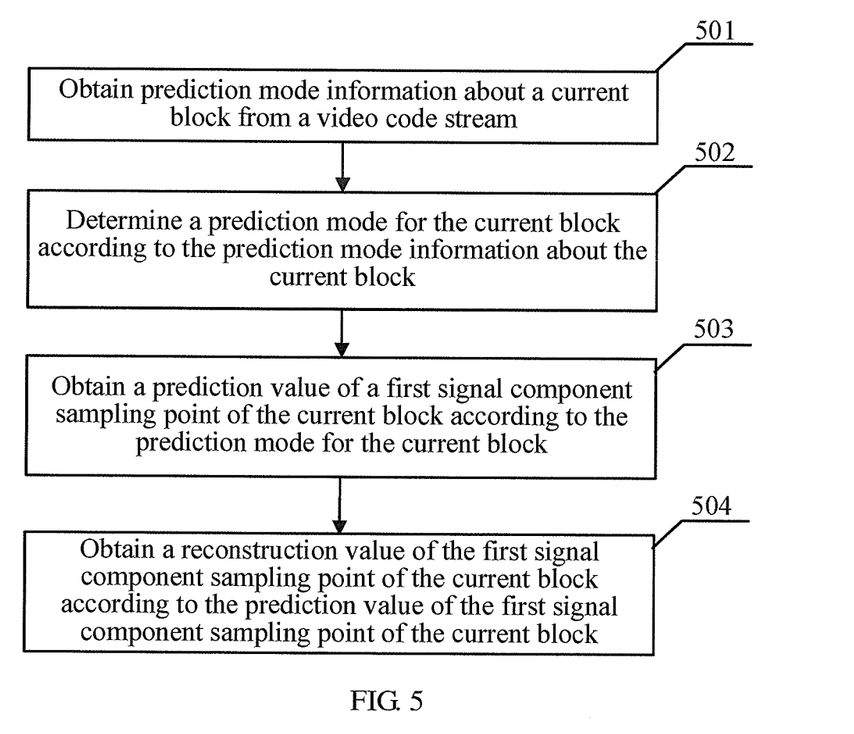
FIG. 5 is a flowchart of a decoding method according to an embodiment of the present invention.

With reference to FIG. 5, the following describes an intra-frame decoding method for a signal component sampling point of an image block provided by an embodiment of the present invention.

S501: Obtain prediction mode information about a current block from a video code stream.

S502: Determine a prediction mode for the current block according to the prediction mode information about the current block, where the prediction mode for the current block is used to predict a first signal component and a second signal component of the current block.

S503: Obtain a prediction value of a first signal component sampling point of the current block according to the prediction mode for the current block.

S504: Obtain a reconstruction value of the first signal component sampling point of the current block according to the prediction value of the first signal component sampling point of the current block.

In the technical solution provided by the embodiment of the present invention, a technical means of making the prediction mode for the first signal component of the current block and the prediction mode for the second signal component of the current block to be the same prediction mode is used, thereby reducing complexity of implementing a decoding end.

Figure 6:
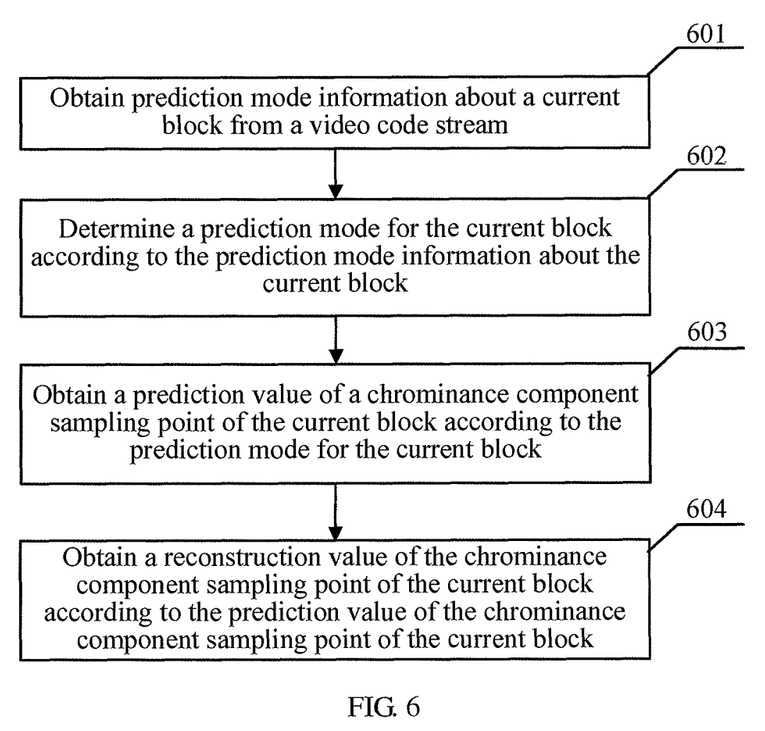
FIG. 6 is a flowchart of a decoding method according to an embodiment of the present invention.

With reference to FIG. 6, the following describes an intra-frame decoding method for a signal component sampling point of an image block provided by an embodiment of the present invention by using an example that a first signal component is a chrominance component and a second signal component is a luminance component.

S601: Obtain prediction mode information about a current block from a video code stream.

S602: Determine a prediction mode for the current block according to the prediction mode information about the current block, where the prediction mode for the current block is used to predict a chrominance component and a luminance component of the current block.

The prediction mode for the current block may be construed to indicate that the prediction mode for the luminance component of the current block and the prediction mode for the chrominance component of the current block are the same prediction mode, which may be determined by a decoding end according to the prediction mode information about the current block in the video code stream.

In the embodiment of the present invention, the prediction mode for the current block may be one of a DC mode, a vertical mode, a horizontal mode, and a planar mode, and may also be another directional prediction mode. Using a horizontal right direction as a reference, prediction directional angles in the vertical mode and the horizontal mode are respectively 90 degrees and 0 degrees. The other directional prediction mode is an extension of the vertical mode and the horizontal mode, and a prediction directional angle in the another directional prediction mode is finer and may be 45 degrees, 60 degrees, or the like. Assuming that 34 optional prediction modes exist for the current block, including the DC mode, the vertical mode, the horizontal mode, the planar mode, and other directional prediction modes, a flag of the most possible prediction mode and a 5-bit fixed-length code may be used as the prediction mode information about the current block to indicate that the prediction mode for the current block is one of the foregoing 34 prediction modes.

S603: Obtain a prediction value of a chrominance component sampling point of the current block according to the prediction mode for the current block.

In the embodiment of the present invention, because the prediction mode for the luminance component of the current block and the prediction mode for the chrominance component of the current block are the same prediction mode, the prediction value of the chrominance component sampling point of the current block is computed from a surrounding chrominance component sampling point of the current block according to the prediction mode for the current block.

S604: Obtain a reconstruction value of the chrominance component sampling point of the current block according to the prediction value of the chrominance component sampling point of the current block.

The reconstruction value of the chrominance component sampling point of the current block is computed based on the obtained prediction value of the chrominance component sampling point of the current block and a residual value of the chrominance component sampling point of the current block obtained by performing reconstruction. The residual value of the chrominance component sampling point of the current block may be obtained based on residual information about the chrominance component sampling point of the current block that is obtained from the video code stream. Specifically, the residual value of the chrominance component sampling point of the current block may be reconstructed by using a method in an H.264/AVC standard or a current HEVC solution, and details are not described herein.

In the technical solution provided by the embodiment of the present invention, a technical means of making the prediction mode for the luminance component of the current block and the prediction mode for the chrominance component of the current block to be the same prediction mode is used, thereby reducing complexity of implementing a decoding end.

Figure 7:
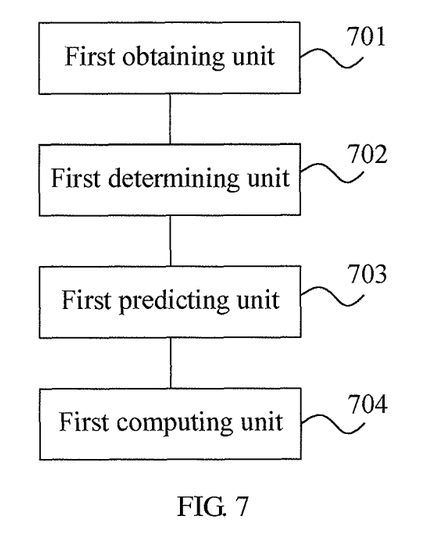
FIG. 7 is a schematic diagram of a decoding apparatus according to an embodiment of the present invention.

As shown in FIG. 7, an embodiment of the present invention provides an intra-frame decoding apparatus for a signal component sampling point of an image block, including:

a first obtaining unit 701, configured to obtain prediction mode information about a first signal component of a current block from a video code stream;

a first determining unit 702, configured to determine a prediction mode for the first signal component of the current block according to the prediction mode information about the first signal component of the current block, where the prediction mode for the first signal component of the current block is one of a DM mode and an LM mode;

a first predicting unit 703, configured to obtain a prediction value of a first signal component sampling point of the current block according to the prediction mode for the first signal component of the current block; and a first computing unit 704, configured to obtain a reconstruction value of the first signal component sampling point of the current block according to the prediction value of the first signal component sampling point of the current block.

In some implementation manners, the first predicting unit 703 is specifically configured to: if it is determined, according to the prediction mode information about the first signal component of the current block, that the prediction mode for the first signal component of the current block is the DM mode, compute the prediction value of the first signal component sampling point of the current block based on a reconstruction value of a surrounding first signal component sampling point of the current block according to a prediction mode for a second signal component of the current block.

In some implementation manners, the first predicting unit 703 is specifically configured to: if it is determined, according to the prediction mode information about the first signal component of the current block, that the prediction mode for the first signal component of the current block is the LM mode, compute the prediction value of the first signal component sampling point of the current block based on a reconstruction value of a second signal component sampling point of the current block.

The apparatus provided by the embodiment of the present invention is configured to implement the methods shown in FIG. 1 and FIG. 2, and details are not repeatedly described herein.

In the apparatus provided by the embodiment of the present invention, a technical means of providing a prediction mode set that is of the first signal component and includes only the DM mode and the LM mode is used, thereby reducing complexity of implementing a decoding end.

Figure 8:
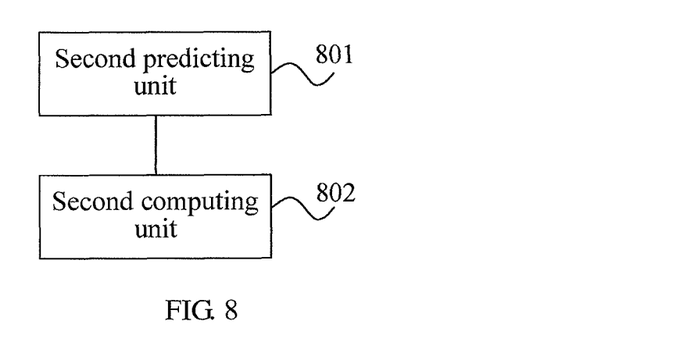
FIG. 8 is a schematic diagram of a decoding apparatus according to an embodiment of the present invention.

As shown in FIG. 8, an embodiment of the present invention provides an intra-frame decoding apparatus for a signal component sampling point of an image block, including:

a second predicting unit 801, configured to obtain a prediction value of a first signal component sampling point of a current block always according to a prediction mode for a second signal component of the current block during a decoding process; and a second computing unit 802, configured to obtain a reconstruction value of the first signal component sampling point of the current block according to the prediction value of the first signal component sampling point of the current block.

In some implementation manners, the second predicting unit 801 is specifically configured to compute the prediction value of the first signal component sampling point of the current block based on a reconstruction value of a surrounding first signal component sampling point of the current block according to the prediction mode for the second signal component.

The apparatus provided by the embodiment of the present invention is configured to implement the methods shown in FIG. 3 and FIG. 4, and details are not repeatedly described herein.

In the apparatus provided by the embodiment of the present invention, a technical means of obtaining the prediction value of the first signal component sampling point of the current block always according to the prediction mode for the second signal component of the current block in the decoding process is used, thereby reducing complexity of implementing a decoding end.

Figure 9:
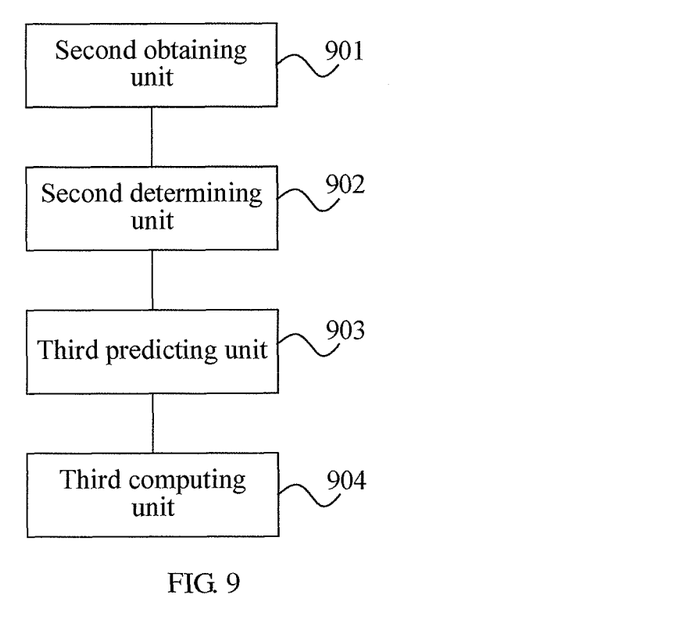
FIG. 9 is a schematic diagram of a decoding apparatus according to an embodiment of the present invention.

As shown in FIG. 9, an embodiment of the present invention provides an intra-frame decoding apparatus for a signal component sampling point of an image block, including:

a second obtaining unit 901, configured to obtain prediction mode information about a current block from a video code stream;

a second determining unit 902, configured to determine a prediction mode for the current block according to the prediction mode information about the current block, where the prediction mode for the current block is used to predict a first signal component and a second signal component of the current block;

a third predicting unit 903, configured to obtain a prediction value of a first signal component sampling point of the current block according to the prediction mode for the current block; and a third computing unit 904, configured to obtain a reconstruction value of the first signal component sampling point of the current block according to the prediction value of the first signal component sampling point of the current block.

In some implementation manners, the third predicting unit 903 is specifically configured to compute the prediction value of the first signal component sampling point of the current block based on a reconstruction value of a surrounding first signal component sampling point of the current block according to the prediction mode for the current block.

The apparatus provided by the embodiment of the present invention is configured to implement the methods shown in FIG. 5 and FIG. 6, and details are not repeatedly described herein.

In the apparatus provided by the embodiment of the present invention, a technical means of making the prediction mode for the first signal component of the current block and the prediction mode for the second signal component of the current block to be the same prediction mode is used, thereby reducing complexity of implementing a decoding end.

In another aspect, a technical effect of the embodiment of the present invention is reducing complexity of a coding end. In existing HEVC, content of a prediction mode set of a chrominance component needs to be adjusted according to a prediction mode for a luminance component, which, in entropy coding, is specifically that codeword assignment of a prediction mode for the chrominance component needs to be dynamically adjusted according to the prediction mode for the luminance component. For example, if the prediction mode for the luminance component is a vertical mode, a codeword originally used to indicate the vertical mode for the chrominance component is used to indicate a backup mode. Content of a prediction mode set of the chrominance component provided by the embodiment of the present invention does not need to be adjusted according to the prediction mode for the luminance component, thereby reducing complexity.

In addition, in the prediction mode set of the chrominance component in the existing HEVC, a relatively large number of optional prediction modes exist, therefore complexity of computation performed by the coding end during prediction mode selection is high; however, in the prediction mode set of the chrominance component provided by the embodiment of the present invention, the number of optional prediction modes is reduced, and therefore complexity of computation performed for prediction mode selection is reduced. As shown in Table X, simulation about saved coding time shows that coding time for an intra-frame prediction coding image is reduced by about 10%.

| Prediction Mode Set | Coding Configuration HE | Coding Configuration LC |
| --- | --- | --- |
| DM mode and LM mode | 9% | 12% |
| DM mode | 11% | 16% |

While achieving the foregoing beneficial effects of the embodiment of the present invention, the prediction mode set of the chrominance component provided by the embodiment of the present invention basically has no effect on video image compression efficiency, as shown in Table Y.

| | Coding Configuration 1 | | | | Coding Configuration 2 | | | |
| --- | --- | --- | --- | --- | --- | --- | --- | --- |
| Prediction Mode Set | Bit rate increase | PSNR Y increase (dB) | PSNR U increase (dB) | PSNR V increase (dB) | Bit rate increase | PSNR Y increase (dB) | PSNR U increase (dB) | PSNR V increase (dB) |
| DM mode and LM mode | 0.05% | 0.00 | −0.03 | −0.04 | 0.13% | 0.00 | −0.06 | −0.08 |
| DM mode | 1.16% | −0.01 | −0.38 | −0.37 | 0.94% | 0.00 | −0.48 | −0.50 |

The technology provided by the embodiments of the present invention is applicable to the field of digital signal processing, and is implemented by using a coder and a decoder. The video coder and decoder are widely applied to various communication devices and electronic devices, such as a digital television, a set-top box, a media gateway, a mobile phone, a wireless apparatus, a personal digital assistant (PDA), a handheld or portable computer, a GPS receiver/navigator, a camera, a video player, a video camera, a video recorder, a monitoring device, a video conference device, and a videophone device. This type of device includes a processor, a memory, and an interface for transmitting data. The video coder and decoder may be directly implemented by a digital circuit or chip, for example, a DSP (digital signal processor), or may be implemented by software code that drives a processor to execute a process in the software code.

Persons of ordinary skill in the art may understand that, all or a part of the steps of the foregoing method embodiments may be implemented by a program instructing relevant hardware. The program may be stored in a computer readable storage medium. When the program runs, the steps of the foregoing method embodiments are performed. The storage medium may be any medium that is capable of storing program codes, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An intra-frame decoding method for a signal component sampling point of an image block, the method comprising:
    obtaining prediction mode information about a first signal component of a current block from a video code stream;
    determining a prediction mode for the first signal component of the current block according to the prediction mode information about the first signal component of the current block, wherein the prediction mode for the first signal component of the current block is one of two possible prediction modes consisting of a DM mode and an LM mode;
    obtaining a prediction value of a first signal component sampling point of the current block according to the prediction mode for the first signal component of the current block; and
    obtaining a reconstruction value of the first signal component sampling point of the current block according to the prediction value of the first signal component sampling point of the current block.

2. The method according to claim 1, wherein if it is determined, according to the prediction mode information about the first signal component of the current block, that the prediction mode for the first signal component of the current block is the DM mode, obtaining a prediction value of a first signal component sampling point of the current block according to the prediction mode for the first signal component of the current block comprises:
    computing the prediction value of the first signal component sampling point of the current block based on a reconstruction value of a surrounding first signal component sampling point of the current block according to a prediction mode for a second signal component of the current block.

3. The method according to claim 1, wherein if it is determined, according to the prediction mode information about the first signal component of the current block, that the prediction mode for the first signal component of the current block is the LM mode, obtaining a prediction value of a first signal component sampling point of the current block according to the prediction mode for the first signal component of the current block comprises:
    computing the prediction value of the first signal component sampling point of the current block based on a reconstruction value of a second signal component sampling point of the current block.

4. The method according to claim 1, wherein:
    the DM mode is a prediction mode in which the prediction value of the first signal component sampling point of the current block is computed from the reconstruction value of a surrounding first signal component sampling point of the current block according to the prediction mode for a second signal component of the current block; and
    the LM mode is a prediction mode in which the prediction value of the first signal component sampling point of the current block is computed based on the reconstruction value of a second signal component sampling point of the current block.

5. The method according to claim 2, wherein the first signal component is a chrominance component, and the second signal component is a luminance component.

6. An intra-frame decoding method for a signal component sampling point of an image block, the method comprising:
    obtaining a prediction value of a first signal component sampling point of a current block according to a DM prediction mode for a second signal component of the current block during a decoding process, wherein the DM prediction mode is always used without a selection of the DM prediction mode from among a plurality of possible prediction modes; and
    obtaining a reconstruction value of the first signal component sampling point of the current block according to the prediction value of the first signal component sampling point of the current block.

7. The method according to claim 6, wherein obtaining a prediction value of a first signal component sampling point of a current block according to a DM prediction mode for a second signal component of the current block comprises:
    computing the prediction value of the first signal component sampling point of the current block based on a reconstruction value of a surrounding first signal component sampling point of the current block according to the DM prediction mode for the second signal component of the current block.

8. The method according to claim 6, wherein the first signal component is a chrominance component, and the second signal component is a luminance component.

9. An intra-frame decoding method for a signal component sampling point of an image block, the method comprising:
    obtaining prediction mode information about a current block from a video code stream, the prediction mode information comprising a five-bit fixed-length code indicating a prediction mode for the current block;
    determining the prediction mode for the current block according to the prediction mode information about the current block, wherein the prediction mode for the current block is used to predict a first signal component and a second signal component of the current block;
    obtaining a prediction value of a first signal component sampling point of the current block according to the prediction mode for the current block; and
    obtaining a reconstruction value of the first signal component sampling point of the current block according to the prediction value of the first signal component sampling point of the current block.

10. The method according to claim 9, wherein obtaining a prediction value of a first signal component sampling point of the current block according to the prediction mode for the current block comprises:
    computing the prediction value of the first signal component sampling point of the current block based on a reconstruction value of a surrounding first signal component sampling point of the current block according to the prediction mode for the current block.

11. The method according to claim 9, wherein the first signal component is a chrominance component, and the second signal component is a luminance component.

12. An intra-frame decoding apparatus for a signal component sampling point of an image block, the apparatus comprising:
at least one processor configured to:
obtain prediction mode information about a first signal component of a current block from a video code stream;
determine a prediction mode for the first signal component of the current block according to the prediction mode information about the first signal component of the current block, wherein the prediction mode for the first signal component of the current block is one of a DM mode and an LM mode;
obtain a prediction value of a first signal component sampling point of the current block according to the prediction mode for the first signal component of the current block; and
obtain a reconstruction value of the first signal component sampling point of the current block according to the prediction value of the first signal component sampling point of the current block.

13. The apparatus according to claim 12, wherein the at least one processor is further configured to:
if it is determined, according to the prediction mode information about the first signal component of the current block, that the prediction mode for the first signal component of the current block is the DM mode, compute the prediction value of the first signal component sampling point of the current block based on a reconstruction value of a surrounding first signal component sampling point of the current block according to a prediction mode for a second signal component of the current block.

14. The apparatus according to claim 12, wherein the at least one processor is further configured to:
if it is determined, according to the prediction mode information about the first signal component of the current block, that the prediction mode for the first signal component of the current block is the LM mode, compute the prediction value of the first signal component sampling point of the current block based on a reconstruction value of a second signal component sampling point of the current block.

* * * * *

UNITED STATES PATENT AND TRADEMARK OFFICE
CERTIFICATE OF CORRECTION

PATENT NO. : 9,674,529 B2  
APPLICATION NO. : 14/265491  
DATED : June 6, 2017  
INVENTOR(S) : Haitao Yang et al.

Page 1 of 1

It is certified that error appears in the above-identified patent and that said Letters Patent is hereby corrected as shown below:

On the Title Page

Please correct the Applicant's address as follows:
Guangdon should be "Guangdong".

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*